United States Patent [19]
Brown, deceased

[11] 3,743,643
[45] July 3, 1973

[54] SUBSTITUTED TRIAZINES
[75] Inventor: Melancthon S. Brown, deceased, late of Berkeley, Calif. by Gustave K. Kohn, administrator
[73] Assignee: Chevron Research Company, San Francisco, Calif.
[22] Filed: May 12, 1971
[21] Appl. No.: 142,758

[52] U.S. Cl. .................................. 260/249.8, 71/93
[51] Int. Cl. ............................................. C07d 55/20
[58] Field of Search ................................... 260/249.8

[56] References Cited
UNITED STATES PATENTS
3,141,885  7/1964  Ross et al. ........................ 260/249.8

Primary Examiner—John M. Ford
Attorney—J. A. Buchanan, Jr.

[57] ABSTRACT

Triazines of the formula

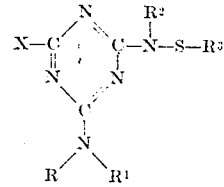

wherein X is halogen or alkylthio; R is hydrogen or alkyl; $R^1$ and $R^2$ are individually alkyl and $R^3$ is aryl optionally substituted with halogen atoms, alkyl groups or alkoxy groups, are useful as herbicides.

10 Claims, No Drawings

SUBSTITUTED TRIAZINES

BACKGROUD OF THE INVENTION

1. Field

The present invention is irected to 2,4,6-substituted 1,3,5-triazines and their use as herbicides. More particularly, the present invention is directd to 2-(N-arylthio-N-alkylamino)-4-alkylamino-6-halo- or -6-alkylthio-1,3,5-triazines.

2. Prior Art

Triazines and derivatives thereof are known to have utility in a variety of areas such as fungicides and herbicides. U.S. Pat. Nos. 2,891,855, 2,909,419 and 2,907,763 disclose amino substituted triazines and their use as hericides. U.S. Pat. Nos. 3,079,391 and 3,138,445 disclose perchloromethylmercaptoamino triazines and their use as herbicides.

DESCRIPTION OF THE INVENTION

Compounds of the present invention may be represented by the formula

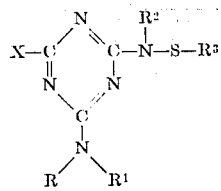

wherein X is halogen of atomic number 9 to 35 (fluorine, chlorine or bromine) or alkylthio of 1 to 4 carbon atoms; R is hydrogen or alkyl of 1 to 4 carbon atoms; $R^1$ is alkyl of 1 to 4 carbon atoms; $R^2$ is alkyl of 1 to 4 carbon atoms and $R^3$ is aryl of 6 to 12 carbon atoms substitued with 0 to 2 halogen atoms of atomic number 9 to 35, alkyl groups of 1 to 4 carbon atoms or alkoxy groups of 1 to 4 carbon atoms (the total number of substituents is preferably 2). Preferably, $R^3$ is phenyl substituted with 0 to 2 halogens of atomic number 9 to 35, alkyl groups of 1 to 4 carbon atoms or alkoxy groups of 1 to 4 carbon atoms.

Preferably X is chlorine or methylthio; R is hydrogen; $R^1$ is alkyl of 1 to 3 carbon atoms; $R^2$ is alkyl of 1 to 3 carbon atoms and $R^3$ is phenyl substituted with 0 to 1 halogens of atomic number 9 to 35, particularly chlorine. More preferably $R^1$ and $R_2$ are the same.

Represenaative alkylthio groups which X may represent include methylthio, ethylthio, isopropylthio, n-propylthio, n-butylthio, sec.butylthio, etc.

Representative alkyl groups which R, $R^1$ and $R^2$ may represent include methyl, ethyl, n-propyl, isopropyl, n-butyl, t-butyl, sec.butyl, etc.

Representative aryl groups which $R^3$ may represent include phenyl, naphthyl, 4-chlorophenyl, 4-bromophenyl, 4-fluorophenyl, 3,4-dichlorophenyl, 2,4-dichlorophenyl, 3,5-difluorophenyl, 4-methylphenyl, 4-ethylphenyl, 2-chloro-4-methylphenyl, 4-methoxyphenyl, 4-butoxyphenyl, 2,4-dimethoxyphenyl, etc.

Representative compounds of the present invention include 2-(N-phenylthio-N-methylamino)-4-methylamino-6-chloro-1,3,5-triazine, 2-(N-phenylthio-N-methylamino)-4-dimethylamino-6-fluoro-1,3,5-triazine, 2-(N-4-chlorophenylthio-N-ethylamino)-4-methylamino-6-chloro-1,3,5-triazine, 2-(N-4-chlorophenylthio-N-ethylamino)-4-methylamino-6-bromo-1,3,5-triazine, 2-(N-4-chlorophenylthio-N-ethylamino)-4-methylamino-6-fluoro-1,3,5-triazine, 2-(N-4-chlorophenylthio-N-ethylamino)-4-isopropylamino-6-chloro-1,3,5-triazine, 2-(N-3,4-dichlorophenylthio-N-methylamino)-4-methylethylamino-6-chloro-1,3,5-triazine, 2-(N-4-methylphenylthio-N-n-butylamino)-4-dimethylamino-6-methylthio-1,3,5-triazine, 2-(N-4-methoxyphenylthio-N-isopropylamino)-4-t-butylamino-6-chloro-1,3,5-triazine, 2-(N-2-chloro-4-methylphenylthio-N-ethylamino)-4-methylisopropylamino-6-n-butylthio-1,3,5-triazine, 2-(N-1-naphthylthio-N-methylamino)-4-methylamino-6-chloro- 1,3,5-triazine, etc.

The compounds of the present invention are prepared by reacting a sulfenyl halide with an aminotriazine in approximately equimolar amounts in the presence of a basic acceptor according to the following reaction

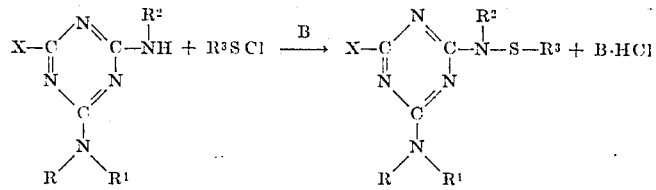

wherein X, R, $R^1$, $R^2$ and $R^3$ are as defined above and B represents a basic acceptor such as pyridine or triethylamine. The amount of basic acceptor should be at least equal in moles to the sulfenyl chloride. Normally the reaction is conducted in a polar watermiscible solvent such as dimethylformamide, acetonitrile, dimethoxyethane or dimethyl sulfoxide. In such highly polar solvents temperatures of 20 to 30° C. and reaction times of one-quarter to 10 hours are adequate for completion of the reaction. The product is isolated by adding a solvent not miscible with water, for example chlorinated hydrocarbons such as methylene chloride or chloroform, benzene, toluene, diethylether, etc. and then water washing to remove the initial solvent and the amine salt. The product can then be isolated further by addition of a nonpolar solvent such as hexane or by evaporation to dryness. The crude product can be purified by recrystallization or chromatography.

When the aminotriazine reactant has R as H, and $R^1$ and $R^2$ as different alkyl groups, a mixture of products is obtained. Separation is generally accomplished by crystallization or chromatography.

Alternately, the compounds of the present invention can be prepared by conducting the reaction indicated above in the presence of a less polar solvent such as benzene or toluene in the presence of a tertiary amine such as 2,6-lutidine, collidine, pyridine or triethylamine. When using these solvents, such as benzene or toluene, higher reaction temperatures and longer reaction times will generally be desirable. A temperature of 50° C. up to the boiling point of the solvent will generally be employed. When the reaction is complete, the amine salt and the unreacted triazine may be removed by filtration and any residual amine salt washed out with water. The product may then be isolated by evaporating to dryness or concentrating and precipitating with a less polar solvent such as hexane. The product may be purified by recrystallization or by digesting in a nonpolar solvent such as hexane.

The present invention can be more fully understood by reference to the following examples showing the preparation of select compounds. The examples are not considered limiting but are illustrative of the method of preparation. Unless otherwise indicated, percentages are by weight. Example 1 - 2-(N-4-chlorophenylthio-N-ethylamino)-4-ethylamino-6-chloro-1,3,5-triazine 14.2 g. (0.08 mole) of 4-chlorophenylsulfenyl chloride was slowly added to 20.0 g. (0.1 mole) of 2,4-bis-ethylamino-6-chloro-1,3,5-triazine and 7.0 g. of pyridine in 100 ml. dimethylformamide at ambient temperature. The reaction mixture was stirred for 2 hours, diluted with 750 ml. diethyl ether, washed once with 500 ml. water then twice with 250 ml. portions of water, followed by drying over magnesium sulfate and filtering. The solvent was removed under vacuum and the crude crystalline product purified by chromatographing on a silica gel column, eluting with ether-hexane. The product isolated by chromatography was further purified by recrystallizing from benzene-hexane. The recrystallized material melted at 131°–5° C. and analyzed as follows:

|   | Calculated | Found |
|---|---|---|
| S % | 9.30 | 9.32 |
| Cl % | 20.6 | 20.70 |

Example 2 - 2-(N-4-chlorophenylthio-N-isopropylamino)-4-isopropylamino-6-methylthio-1,3,5-triazine 33 g. (0.185 mole) of 4-chlorophenylsulfenyl chloride was added slowly to 30 g. (0.124 mole) of 2,4-bis-isopropyl-6methylthio-1,3,5-triazine and 20 g. of pyridine in 150 ml. di-methylformamide. After being stirred for one hour the reaction mixture was diluted with ether, washed with water, dried over magnesium sulfate and filtered. The solvent was removed under vacuum and the crude product chromatographed on a column of silica gel, eluting with ether-hexane. 2-(N-4-chlorophenylthio-4-isopropylamino)-4-isopropylamino-6-methylthio-1,3,5-triazine was recovered as an oil. Analysis was as follows:

|   | Calculated | Found |
|---|---|---|
| S % | 16.71 | 16.32 |
| Cl % | 9.26 | 9.84 |

Other compounds of the present invention were prepared and are tabulated in Table I.

TABLE I

| Compound | Elemental analysis, percent | | | | Melting point, °C. |
|---|---|---|---|---|---|
|  | Sulfur | | Chlorine | | |
|  | Calculated | Found | Calculated | Found | |
| 2-(N-phenylthio-N-ethylamino)-4-ethylamino-6-chloro-1,3,5-triazine | 10.33 | 10.12 | 11.45 | 11.26 | 93–96 |
| 2-(N-4-chlorophenylthio-N-ethylamino)-4-isopropylamino-6-chloro-1,3,5-triazine | 8.96 | 8.93 | 19.75 | 19.73 | 92–100 |

UTILITY

The triazines of the present invention are, in general, herbicidal in both pre- and post-emergence applications. For preemergence control of undesirable vegetation these triazines will be applied in herbicidal quantities to the environment, e.g., soil infested with seeds and/or seedlings of such vegetation. Such application will inhibit the growth of or kill the seeds, germinating seeds and seedlings. For post-emergence applications the triazines of the present invention will be applied directly to the foliage and other plant parts. Generally they are effective against weed grasses as well as broadleaved weeds. Some may be selective with respect to type of application and/or of weed.

Pre- and post-emergence herbicidal tests on representative triazines of this invention were made using the following methods:

Pre-Emergence Test

An acetone solution of the test triazines was prepared by mixing 750 mg. triazine, 220 mg. of nonionic surfactant and 25 ml. of acetone. This solution was added to approximately 125 ml. of water containing 156 mg. of surfactant.

Seeds of the test vegetation were planted in a pot of soil and the triazine solution was sprayed uniformly onto the soil surface at a dose of 100 mg. per cm$^2$. The pot was watered and placed in a greenhouse. The pot was watered intermittently and was observed for seedling emergence, health of emerging seedlings, etc. for a 3-week period. At the end of this period the herbicidal effectiveness of the triazine was rated based on the physiological observations. A 0 to 100 scale was used; 0 representing no phytotoxicity, 100 representing complete kill.

Post-Emergence Test

The test triazine was formulated in the same manner as described above for the pre-emergence test. The concentration of the triazine in this formulation was 5,000 ppm. This formulation was uniformly sprayed on 2 replicate pots of 24-day-old plants (approximately 15 to 25 plants per pot) at a dose of 100 mg. per cm$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the triazine was rated based on these observations. A 0 to 100 scale was used; 0 representing no phytotoxicity, 100 representing complete kill.

The results of these tests appear in Table II.

TABLE II

| Compound | Herbicidal effectiveness, pre/post | | | | | |
|---|---|---|---|---|---|---|
|  | O | W | C | M | P | L |
| 2-(N-4-chlorophenylthio-N-ethylamino)-4-ethylamino-6-chloro-1,3,5-triazine | 99/100 | 98/100 | 98/100 | 98/100 | 100/100 | 100/100 |
| 2-(N-4-chlorophenylthio-N-isopropylamino)-4-isopropylamino-6-methylthio-1,3,5-triazine | 75/100 | 100/100 | 100/100 | 100/100 | 100/100 | 100/100 |
| 2-(N-phenylthio-N-ethylamino)-4-ethylamino-6-chloro-1,3,5-triazine | 100/100 | 100/100 | 100/100 | 100/100 | 100/100 | 100/100 |
| 2-(N-4-chlorophenylthio-N-ethylamino)-4-isopropylamino-6-chloro-1,3,5-triazine | 100/100 | 100/100 | 100/100 | 100/100 | 100/100 | 100/100 |

NOTE.—O=Wild oats (*Avena fatua*); W=Watergrass (*Echinochloa crusgalli*); C=Crabgrass (*Digitaria sanguinalis*); M=Mustard (*Brassica arvensis*); P=Pigweed (*Amaranthus retroflexus*); L=Lambsquarter (*Chenopodium album*).

The amount of triazine administered will vary with the particular plant part or plant growth medium which is to be contacted, the general location of application, i.e., sheltered areas such as greenhouses as compared to exposed areas such as fields, as well as the desired type of control. For pre-emergent control of most plants dosages in the range of about 0.5 to 20 lbs. per acre will be used. Such administration will give a concentration of about 2 to 80 ppm. triazine distributed throughout 0.1 acre-foot. For post-emergence application, such as foliar spray application, compositions containing about 0.5 to 8 lbs. triazine per 100 gal. spray will be used. Such application is equivalent to about 0.5 to 20 lbs. triazine per acre.

The herbicidal compositions of this invention comprise a herbicidal amount of one or more of the above described triazines intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

As will be evident to those skilled in the art, various modifications on this invention can be made or followed, in the light of the foregoing disclosure and discussion, without departing from the spirit or scope of the disclosure or from the scope of the following claims.

I claim:

1. Compound of the formula

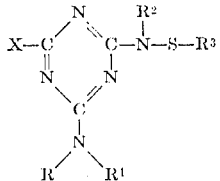

wherein X is halogen of atomic number 9 to 35 or alkylthio of 1 to 4 carbon atoms; R is hydrogen or alkyl of 1 to 4 carbon atoms; $R^1$ and $R^2$ are individually alkyl of 1 to 4 carbon atoms; $R^3$ is carbocyclic aryl of 6 to 12 carbon atoms substituted with 0 to 2 halogen atoms of atomic number 9 to 35, with 0 to 2 alkyl groups of 1 to 4 carbon atoms or with 0 to 2 alkoxy groups of 1 to 4 carbon atoms.

2. Compound of claim 1 wherein $R^3$ is phenyl substituted with 0 to 2 halogen atoms of atomic number 9 to 35, with 0 to 2 alkyl groups of 1 to 4 carbon atoms, or with 0 to 2 alkoxy groups of 1 to 4 carbon atoms.

3. Compound of claim 2 wherein $R^3$ is phenyl substituted with 0 to 1 halogen atom of atomic number 9 to 35.

4. Compound of claim 2 wherein R is hydrogen.

5. Compound of claim 1 wherein X is chlorine or methylthio; R is hydrogen; $R^1$ is alkyl of 1 to 3 carbon atoms; $R^2$ is alkyl of 1 to 3 carbon atoms and $R^3$ is phenyl or chlorophenyl.

6. Compound of claim 5 wherein $R^3$ is phenyl or 4-chlorophenyl.

7. Compound of claim 6 being 2-(N-4-chlorophenylthio-N-ethylamino)-4-ethylamino-6-chloro-1,3,5-triazine.

8. Compound of claim 6 being 2-(N-4-chlorophenylthio-N-isopropylamino)-4-isopropylamino-6-methylthio-1,3,5-triazine.

9. Compound of claim 6 being 2-(N-phenylthio-N-ethylamino)-4-ethylamino-6-chloro-1,3,5-triazine.

10. Compound of claim 6 being 2-(N-4-chlorophenylthio-N-ethylamino)-4-isopropylamino-6-chloro-1,3,5-triazine.

* * * * *